United States Patent
Ricci et al.

(10) Patent No.: US 7,836,379 B1
(45) Date of Patent: *Nov. 16, 2010

(54) METHOD FOR COMPUTING BUFFER ECC

(75) Inventors: Paul B. Ricci, Rancho Santa Margarita, CA (US); Mohammad M. Negahban, Coto de Caza, CA (US); Yujun Si, Tustin, CA (US)

(73) Assignee: Marvell International Ltd., Hamilton (BM)

( * ) Notice: Subject to any disclaimer, the term of this patent is extended or adjusted under 35 U.S.C. 154(b) by 1014 days.

This patent is subject to a terminal disclaimer.

(21) Appl. No.: 11/605,797

(22) Filed: Nov. 29, 2006

Related U.S. Application Data (60) Provisional application No. 60/788,677, filed on Apr. 3, 2006.

(51) Int. Cl.
*G11C 29/00* (2006.01)
*H03M 13/00* (2006.01)
(52) U.S. Cl. .................. 714/770; 714/769; 714/755
(58) Field of Classification Search .............. 714/769, 714/770, 755
See application file for complete search history.

(56) References Cited

U.S. PATENT DOCUMENTS

| | | | | |
|---|---|---|---|---|
| 5,195,100 A * | 3/1993 | Katz et al. | ...... | 714/22 |
| 5,233,618 A * | 8/1993 | Glider et al. | ...... | 714/6 |
| 5,313,585 A * | 5/1994 | Jeffries et al. | ...... | 711/201 |
| 5,469,453 A * | 11/1995 | Glider et al. | ...... | 714/6 |
| 5,475,697 A * | 12/1995 | Katz et al. | ...... | 711/159 |
| 5,581,715 A * | 12/1996 | Verinsky et al. | ...... | 714/48 |
| 5,589,998 A * | 12/1996 | Yu | ...... | 360/78.14 |
| 5,600,662 A * | 2/1997 | Zook | ...... | 714/769 |
| 5,602,857 A * | 2/1997 | Zook et al. | ...... | 714/769 |
| 5,629,949 A * | 5/1997 | Zook | ...... | 714/769 |
| 5,696,775 A * | 12/1997 | Nemazie et al. | ...... | 714/805 |
| 5,758,054 A * | 5/1998 | Katz et al. | ...... | 714/22 |
| 6,125,469 A * | 9/2000 | Zook et al. | ...... | 714/769 |
| 6,367,047 B1 * | 4/2002 | McAuliffe et al. | ...... | 714/755 |
| 6,381,706 B1 * | 4/2002 | Zaczek | ...... | 714/5 |
| 6,546,440 B1 * | 4/2003 | Verinsky et al. | ...... | 710/62 |
| 6,584,527 B2 * | 6/2003 | Verinsky et al. | ...... | 710/305 |
| 6,636,908 B1 * | 10/2003 | Winokur et al. | ...... | 710/29 |
| 6,654,862 B2 * | 11/2003 | Morris | ...... | 711/162 |
| 6,721,828 B2 * | 4/2004 | Verinsky et al. | ...... | 710/62 |
| 6,728,855 B2 * | 4/2004 | Thiesfeld et al. | ...... | 711/170 |
| 6,934,725 B1 * | 8/2005 | Dings | ...... | 1/1 |
| 6,968,404 B2 * | 11/2005 | Verinsky et al. | ...... | 710/62 |
| 6,981,171 B2 * | 12/2005 | Hashemi | ...... | 714/5 |
| 7,111,228 B1 * | 9/2006 | Ricci | ...... | 714/805 |
| 7,178,086 B2 * | 2/2007 | Hassner et al. | ...... | 714/758 |
| 7,313,721 B2 * | 12/2007 | Ashmore | ...... | 714/7 |
| 7,418,645 B2 * | 8/2008 | Srivastava | ...... | 714/758 |
| 7,559,009 B1 * | 7/2009 | Ricci | ...... | 714/805 |
| 7,617,352 B2 * | 11/2009 | Mukaida et al. | ...... | 711/103 |

* cited by examiner

*Primary Examiner*—Joseph D Torres (57) ABSTRACT

A system includes a receive module, a control module and a read module. The receive module receives a first block that includes first data, a first cyclic redundancy check (CRC) checksum, and a first error-correcting code (ECC) value. The first CRC checksum and the first ECC value include a logical block address (LBA). The control module generates a first derived CRC checksum based on the first data. The first derived CRC checksum does not include the LBA. The read module reads a second block from a parity disk. The second block includes parity data, a second CRC checksum, and a second ECC value. The second CRC checksum and the second ECC value include the LBA.

39 Claims, 7 Drawing Sheets

METHOD FOR COMPUTING BUFFER ECC

CROSS-REFERENCE TO RELATED APPLICATIONS

This application claims the benefit of U.S. Provisional Application No. 60/788,677, filed on Apr. 3, 2006. The disclosure of the above application is incorporated herein by reference in its entirety.

FIELD

The present disclosure relates to data processing systems, and more particularly to generating error-correcting codes.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

In recent years, use of large-scale networks that exchange, process, and store large amounts of data at high speed is proliferating. Consequently, demand for reliable data storage systems is increasing. Data may be stored reliably by configuring multiple disk drives in an arrangement called a redundant array of independent disks (RAID).

RAID is a way of storing same data in different locations (i.e., redundantly) on multiple disks. Multiple disks increase mean time between failures (MTBF). Storing data redundantly increases fault tolerance. In some implementations, a RAID system may use a parity disk that stores parity information. The parity disk is updated whenever new data is written on a disk in the RAID system.

Figure 1:
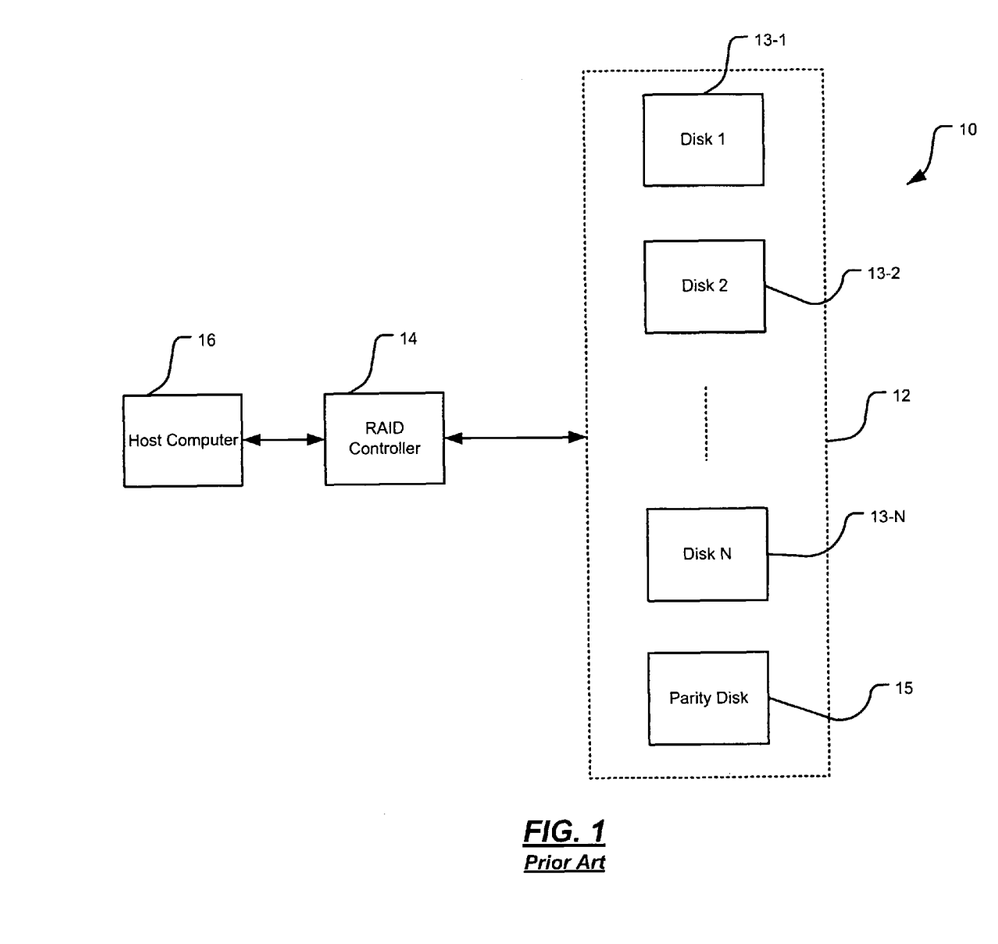
FIG. 1 is a functional block diagram of an exemplary system utilizing redundant array of independent disks (RAID) according to the prior art.

Referring now to FIG. 1, a RAID system 10 comprises a disk array 12, a RAID controller 14, and a host computer 16. The disk array 12 may comprise multiple data disks. The data disks may include Disk 1 13-1, Disk 2 13-2, ..., Disk N 13-N (collectively data disks 13), and a parity disk 15. The RAID controller 14 may link to the host computer 16 via an interface such as small computer system interface (SCSI).

The RAID controller 14 performs read/write operations on one or more data disks 13 according to commands received from the host computer 16. Specifically, the RAID controller 14 writes data generated by the host computer 16 on one or more data disks 13. The RAID controller 14 reads data stored in one or more data disks 13 when the host computer 16 issues read commands for the data.

When new data is written on a data disk 13 in the RAID array 12, the RAID controller 14 updates the parity disk 15. Specifically, the RAID controller 14 reads data stored in the parity disk 15 and calculates an exclusive OR (i.e., an XOR, denoted by the symbol ED) of that data and the new data that is to be written on the data disk 13. The RAID controller 14 uses the result of the XOR operation to overwrite the data stored in the parity disk 15. Thus, if a data disk 13 in the RAID array 12 fails, data stored in the failed data disk 13 can be recovered by calculating XOR of the data stored on the parity disk 15 and data stored in the remaining data disks 13.

For example, suppose data A1=0000 0111 is stored on Disk 1, data A2=0000 0101 is stored on Disk 2, and data A3=0000 0000 is stored on Disk 3. In that case, parity information Ap=A1⊕A2⊕A3=0000 0010 is stored on the parity disk. If Disk 2 fails, missing data A2 can be reconstructed using the XOR operation A1⊕A3⊕Ap=A2.

Data is typically read from disks in sectors or data blocks. Data read from a disk is considered reliable if that data is the same as the data written on the disk. To enable error detection when data is read from a disk, a cyclic redundancy check (CRC) is performed on the data before the data is written on the disk. CRC for a data block is generated as follows. Data in the data block is divided by a predetermined binary keyword. A remainder resulting from the division is called a checkword or a checksum of the data in the data block. The checksum is appended to the data block before the data block is written and stored in the disk.

When the data block is read from the disk, the same division is performed, and the remainder of the division is compared to the checksum in the data block. The data in the data block is considered reliable if the remainder matches the checksum. CRC, however, may not detect errors when data read differs from data written due to an error and yet generates identical remainders in read and write operations.

An error-correcting code (ECC) enables not only detection but also correction of some errors that may be detected in a data block when the data block is read from a disk. Typically, an error-correcting code such as Reed-Solomon code is used to calculate a codeword for the data block. The codeword is calculated and appended to the data block before the data block is written and stored in the disk.

When the data block is read from the disk, the same calculation is performed, and the resulting codeword is compared to the codeword in the data block. The data in the data block is considered error-free if the two codewords match. If an error is detected, the error can be corrected. That is, correct data can be reconstructed using the codeword. Number of errors that can be corrected depends on an error-correcting capability of the code used.

In addition to the data in the data block, the parity disk stores a logical block address (LBA) of the data block. The LBA indicates an address or a location of the data block on a disk. Typically, CRC of each data block is seeded with the LBA of that data block. That is, the CRC includes the LBA information, which is also called the seed information. When the data block to be written at a LBA on a disk is XOR'ed with the data block read from the parity disk having the same LBA, the XORs of the CRCs of the two data blocks does not equal the CRC of the XOR'ed data block.

Consequently, CRC with seed information is generally regenerated for the XOR'ed data block. If CRC for the XOR'ed data block is computed using the data in the XOR'ed data block, any errors that may occur during the XOR operation and CRC regeneration may propagate undetected. Propagation of undetected errors may render the data unreliable. U.S. patent application Ser. No. 11/056,320 filed on Feb. 11, 2005, which is incorporated herein by reference in its entirety, discloses a method for regenerating CRC for the XOR'ed data block.

SUMMARY

A system comprises a receive module and a control module. The receive module receives a first block that includes a first data, a first cyclic redundancy check (CRC) checksum, and a first error-correcting code (ECC) value, wherein the first CRC checksum and the first ECC value include a logical block address (LBA). The control module generates a first derived CRC checksum based on the first data, wherein the first derived CRC checksum does not include the LBA.

In another feature, the system further comprises a write module that communicates with the receive module and that writes the first block on a data disk.

In another feature, the system further comprises a read module that communicates with the control module and that reads from a parity disk a second block that includes a second data, a second CRC checksum, and a second ECC value, wherein the second CRC checksum and the second ECC value include the LBA.

In another feature, the first and second ECC values are generated using an error-correcting code.

In another feature, the first and second ECC values are generated using a Reed-Solomon code.

In another feature, the system further comprises a summing module that communicates with the control module, the receive module, and the read module and that generates a first sum by performing a modulo-2 summation of the first CRC checksum and the first derived CRC checksum.

In another feature, the control module generates a first encoded value of the first sum using the same error-correcting code that is used to generate the first and second ECC values.

In another feature, the summing module generates a third ECC value by performing a modulo-2 summation of the first encoded value and the first and second ECC values, wherein the third ECC value includes the LBA.

In another feature, the summing module generates a third data by performing a modulo-2 summation of the first and second data, and a third CRC checksum by performing a module-2 summation of the first derived CRC checksum and the second CRC checksum.

In another feature, the system further comprises a write module that communicates with the summing module and that writes the third data, the third CRC checksum, and the third ECC value on a parity disk.

In another feature, the control module generates a first derived ECC value based on the first data and the first derived CRC checksum, a second derived CRC checksum based on the second data, where the second derived CRC checksum does not include the LBA, and a second derived ECC value based on the second data and the second derived CRC checksum.

In another feature, the summing module generates a first result by performing a modulo-2 summation of the first ECC value and the first derived ECC value, and a second result by performing a modulo-2 summation of the second ECC value and the second derived ECC value, and wherein the control module determines whether the third ECC value is valid based on the first and second results.

In another feature, the control module generates a first derived ECC value based on the first data and the first derived CRC checksum using the same error-correcting code that is used to generate the first and second ECC values.

In another feature, the system further comprises a summing module that generates a third ECC value by performing a modulo-2 summation of the first derived ECC value and the second ECC value, wherein the third ECC value includes the LBA.

In another feature, the summing module generates a third data by performing a modulo-2 summation of the first and second data, and a third CRC checksum by performing a module-2 summation of the first derived CRC checksum and the second CRC checksum.

In another feature, the system further comprises a write module that communicates with the summing module and that writes the third data, the third CRC checksum, and the third ECC value on a parity disk.

In another feature, the control module generates a second derived CRC checksum based on the second data, where the second derived CRC checksum does not include the LBA, and a second derived ECC value based on the second data and the second derived CRC checksum.

In another feature, the summing module generates a first result by performing a modulo-2 summation of the first ECC value and the first derived ECC value, and a second result by performing a modulo-2 summation of the second ECC value and the second derived ECC value, and wherein the control module determines whether the third ECC value is valid based on the first and second results.

In another feature, a disk controller comprises the system.

In still other features, a system comprises a receive module, a read module, and a control module. The receive module receives a first block that includes a first data, a first cyclic redundancy check (CRC) checksum, and a first error-correcting code (ECC) value, wherein the first CRC checksum and the first ECC value include a logical block address (LBA). The read module reads from a parity disk a second block that includes a second data, a second CRC checksum, and a second ECC value, wherein the second CRC checksum and the second ECC value include the LBA. The control module generates a first derived CRC checksum based on the first data, wherein the first derived CRC checksum does not include the LBA, that generates a modulo-2 sum of the first CRC checksum and the first derived CRC checksum, generates an encoded value of the modulo-2 sum using the same error-correcting code that is used to generate the first and second ECC values, and generates a third ECC value by performing a modulo-2 summation of the encoded value and the first and second ECC values, wherein the third ECC value includes the LBA.

In still other features, a system comprises a receive module, a read module, and a control module. The receive module receives a first block that includes a first data, a first cyclic redundancy check (CRC) checksum, and a first error-correcting code (ECC) value, wherein the first CRC checksum and the first ECC value include a logical block address (LBA). The read module reads from a parity disk a second block that includes a second data, a second CRC checksum, and a second ECC value, wherein the second CRC checksum and the second ECC value include the LBA. The control module generates a first derived CRC checksum based on the first data, wherein the first derived CRC checksum does not include the LBA, generates a first derived ECC value based on the first data and the first derived CRC checksum, and generates a third ECC value by performing a modulo-2 summation of the first derived ECC value and the second ECC value, wherein the third ECC value includes the LBA.

In still other features, a method comprises receiving a first block that includes a first data, a first cyclic redundancy check (CRC) checksum, and a first error-correcting code (ECC) value, wherein the first CRC checksum and the first ECC value include a logical block address (LBA), and generating a first derived CRC checksum based on the first data, wherein the first derived CRC checksum does not include the LBA.

In another feature, the method further comprises writing the first block on a data disk.

In another feature, the method further comprises reading from a parity disk a second block that includes a second data, a second CRC checksum, and a second ECC value, wherein the second CRC checksum and the second ECC value include the LBA.

In another feature, the method further comprises generating the first and second ECC values using an error-correcting code.

In another feature, the method further comprises generating the first and second ECC values using a Reed-Solomon code.

In another feature, the method further comprises generating a first sum by performing a modulo-2 summation of the first CRC checksum and the first derived CRC checksum.

In another feature, the method further comprises generating a first encoded value of the first sum using the same error-correcting code that is used to generate the first and second ECC values.

In another feature, the method further comprises generating a third ECC value by performing a modulo-2 summation of the first encoded value and the first and second ECC values, wherein the third ECC value includes the LBA.

In another feature, the method further comprises generating a third data by performing a modulo-2 summation of the first and second data, and a third CRC checksum by performing a module-2 summation of the first derived CRC checksum and the second CRC checksum.

In another feature, the method further comprises writing the third data, the third CRC checksum, and the third ECC value on a parity disk.

In another feature, the method further comprises generating a first derived ECC value based on the first data and the first derived CRC checksum, a second derived CRC checksum based on the second data, where the second derived CRC checksum does not include the LBA, and a second derived ECC value based on the second data and the second derived CRC checksum.

In another feature, the method further comprises generating a first result by performing a modulo-2 summation of the first ECC value and the first derived ECC value, and a second result by performing a modulo-2 summation of the second ECC value and the second derived ECC value, and determining whether the third ECC value is valid based on the first and second results.

In another feature, the method further comprises generating a first derived ECC value based on the first data and the first derived CRC checksum using the same error-correcting code that is used to generate the first and second ECC values.

In another feature, the method further comprises further comprises generating a third ECC value by performing a modulo-2 summation of the first derived ECC value and the second ECC value, wherein the third ECC value includes the LBA.

In another feature, the method further comprises generating a third data by performing a modulo-2 summation of the first and second data, and a third CRC checksum by performing a module-2 summation of the first derived CRC checksum and the second CRC checksum.

In another feature, the method further comprises writing the third data, the third CRC checksum, and the third ECC value on a parity disk.

In another feature, the method further comprises generating a second derived CRC checksum based on the second data, where the second derived CRC checksum does not include the LBA, and a second derived ECC value based on the second data and the second derived CRC checksum.

In another feature, the method further comprises generating a first result by performing a modulo-2 summation of the first ECC value and the first derived ECC value, and a second result by performing a modulo-2 summation of the second ECC value and the second derived ECC value, and determining whether the third ECC value is valid based on the first and second results.

In still other features, a method comprises receiving a first block that includes a first data, a first cyclic redundancy check (CRC) checksum, and a first error-correcting code (ECC) value, wherein the first CRC checksum and the first ECC value include a logical block address (LBA). The method further comprises reading from a parity disk a second block that includes a second data, a second CRC checksum, and a second ECC value, wherein the second CRC checksum and the second ECC value include the LBA. The method further comprises generating a first derived CRC checksum based on the first data, wherein the first derived CRC checksum does not include the LBA. The method further comprises generating a modulo-2 sum of the first CRC checksum and the first derived CRC checksum, generating an encoded value of the modulo-2 sum using the same error-correcting code that is used to generate the first and second ECC values, and generating a third ECC value by performing a modulo-2 summation of the encoded value and the first and second ECC values, wherein the third ECC value includes the LBA.

In still other features, a method comprises receiving a first block that includes a first data, a first cyclic redundancy check (CRC) checksum, and a first error-correcting code (ECC) value, wherein the first CRC checksum and the first ECC value include a logical block address (LBA). The further comprises reading from a parity disk a second block that includes a second data, a second CRC checksum, and a second ECC value, wherein the second CRC checksum and the second ECC value include the LBA. The method further comprises generating a first derived CRC checksum based on the first data, wherein the first derived CRC checksum does not include the LBA. The method further comprises generating a first derived ECC value based on the first data and the first derived CRC checksum, and generating a third ECC value by performing a modulo-2 summation of the first derived ECC value and the second ECC value, wherein the third ECC value includes the LBA.

In still other features, a system comprises receive means for receiving a first block that includes a first data, a first cyclic redundancy check (CRC) checksum, and a first error-correcting code (ECC) value, wherein the first CRC checksum and the first ECC value include a logical block address (LBA). The system further comprises control means for generating a first derived CRC checksum based on the first data, wherein the first derived CRC checksum does not include the LBA.

In another feature, the system further comprises write means for communicates with the receive means and for writing the first block on a data disk.

In another feature, the system further comprises read means for communicating with the control means and for reading from a parity disk a second block that includes a second data, a second CRC checksum, and a second ECC value, wherein the second CRC checksum and the second ECC value include the LBA.

In another feature, the first and second ECC values are generated using an error-correcting code.

In another feature, the first and second ECC values are generated using a Reed-Solomon code.

In another feature, the system further comprises summing means for communicating with the control means, the receive means, and the read means and for generating a first sum by performing a modulo-2 summation of the first CRC checksum and the first derived CRC checksum.

In another feature, the control means generates a first encoded value of the first sum using the same error-correcting code that is used to generate the first and second ECC values.

In another feature, the summing means generates a third ECC value by performing a modulo-2 summation of the first encoded value and the first and second ECC values, wherein the third ECC value includes the LBA.

In another feature, the summing means generates a third data by performing a modulo-2 summation of the first and second data, and a third CRC checksum by performing a module-2 summation of the first derived CRC checksum and the second CRC checksum.

In another feature, the system further comprises write means for communicating with the summing module and for writing the third data, the third CRC checksum, and the third ECC value on a parity disk.

In another feature, the control means generates a first derived ECC value based on the first data and the first derived CRC checksum, a second derived CRC checksum based on the second data, where the second derived CRC checksum does not include the LBA, and a second derived ECC value based on the second data and the second derived CRC checksum.

In another feature, the summing means generates a first result by performing a modulo-2 summation of the first ECC value and the first derived ECC value, and a second result by performing a modulo-2 summation of the second ECC value and the second derived ECC value, and wherein the control means determines whether the third ECC value is valid based on the first and second results.

In another feature, the control means generates a first derived ECC value based on the first data and the first derived CRC checksum using the same error-correcting code that is used to generate the first and second ECC values.

In another feature, the system further comprises summing means for generating a third ECC value by performing a modulo-2 summation of the first derived ECC value and the second ECC value, wherein the third ECC value includes the LBA.

In another feature, the summing means generates a third data by performing a modulo-2 summation of the first and second data, and a third CRC checksum by performing a module-2 summation of the first derived CRC checksum and the second CRC checksum.

In another feature, the system further comprises write means for communicating with the summing module and for writing the third data, the third CRC checksum, and the third ECC value on a parity disk.

In another feature, the control means generates a second derived CRC checksum based on the second data, where the second derived CRC checksum does not include the LBA, and a second derived ECC value based on the second data and the second derived CRC checksum.

In another feature, the summing module generates a first result by performing a modulo-2 summation of the first ECC value and the first derived ECC value, and a second result by performing a modulo-2 summation of the second ECC value and the second derived ECC value, and wherein the control module determines whether the third ECC value is valid based on the first and second results.

In another feature, a disk controller comprises the system.

In still other features, a system comprises receive means for receiving a first block that includes a first data, a first cyclic redundancy check (CRC) checksum, and a first error-correcting code (ECC) value, wherein the first CRC checksum and the first ECC value include a logical block address (LBA). The system further comprises read means for reading from a parity disk a second block that includes a second data, a second CRC checksum, and a second ECC value, wherein the second CRC checksum and the second ECC value include the LBA. The system further comprises control means for generating a first derived CRC checksum based on the first data, wherein the first derived CRC checksum does not include the LBA, for generating a modulo-2 sum of the first CRC checksum and the first derived CRC checksum, generating an encoded value of the modulo-2 sum using the same error-correcting code that is used to generate the first and second ECC values, and generating a third ECC value by performing a modulo-2 summation of the encoded value and the first and second ECC values, wherein the third ECC value includes the LBA.

In still other features, a system comprises receive means for receiving a first block that includes a first data, a first cyclic redundancy check (CRC) checksum, and a first error-correcting code (ECC) value, wherein the first CRC checksum and the first ECC value include a logical block address (LBA). The system further comprises read means for reading from a parity disk a second block that includes a second data, a second CRC checksum, and a second ECC value, wherein the second CRC checksum and the second ECC value include the LBA. The system further comprises control means for generating a first derived CRC checksum based on the first data, wherein the first derived CRC checksum does not include the LBA, for generating a first derived ECC value based on the first data and the first derived CRC checksum, and generating a third ECC value by performing a modulo-2 summation of the first derived ECC value and the second ECC value, wherein the third ECC value includes the LBA.

In still other features, a computer program executed by a processor comprises receiving a first block that includes a first data, a first cyclic redundancy check (CRC) checksum, and a first error-correcting code (ECC) value, wherein the first CRC checksum and the first ECC value include a logical block address (LBA). The computer program further comprises generating a first derived CRC checksum based on the first data, wherein the first derived CRC checksum does not include the LBA.

In another feature, the computer program further comprises writing the first block on a data disk.

In another feature, the computer program further comprises reading from a parity disk a second block that includes a second data, a second CRC checksum, and a second ECC value, wherein the second CRC checksum and the second ECC value include the LBA.

In another feature, the computer program further comprises generating the first and second ECC values using an error-correcting code.

In another feature, the computer program further comprises generating the first and second ECC values using a Reed-Solomon code.

In another feature, the computer program further comprises generating a first sum by performing a modulo-2 summation of the first CRC checksum and the first derived CRC checksum.

In another feature, the computer program further comprises generating a first encoded value of the first sum using the same error-correcting code that is used to generate the first and second ECC values.

In another feature, the computer program further comprises generating a third ECC value by performing a modulo-2 summation of the first encoded value and the first and second ECC values, wherein the third ECC value includes the LBA.

In another feature, the computer program further comprises generating a third data by performing a modulo-2 summation of the first and second data, and a third CRC checksum by performing a module-2 summation of the first derived CRC checksum and the second CRC checksum.

In another feature, the computer program further comprises writing the third data, the third CRC checksum, and the third ECC value on a parity disk.

In another feature, the computer program further comprises generating a first derived ECC value based on the first data and the first derived CRC checksum, a second derived CRC checksum based on the second data, where the second derived CRC checksum does not include the LBA, and a second derived ECC value based on the second data and the second derived CRC checksum.

In another feature, the computer program further comprises generating a first result by performing a modulo-2 summation of the first ECC value and the first derived ECC value, and a second result by performing a modulo-2 summation of the second ECC value and the second derived ECC value, and determining whether the third ECC value is valid based on the first and second results.

In another feature, the computer program further comprises generating a first derived ECC value based on the first data and the first derived CRC checksum using the same error-correcting code that is used to generate the first and second ECC values.

In another feature, the computer program further comprises further comprises generating a third ECC value by performing a modulo-2 summation of the first derived ECC value and the second ECC value, wherein the third ECC value includes the LBA.

In another feature, the computer program further comprises generating a third data by performing a modulo-2 summation of the first and second data, and a third CRC checksum by performing a module-2 summation of the first derived CRC checksum and the second CRC checksum.

In another feature, the computer program further comprises writing the third data, the third CRC checksum, and the third ECC value on a parity disk.

In another feature, the computer program further comprises generating a second derived CRC checksum based on the second data, where the second derived CRC checksum does not include the LBA, and a second derived ECC value based on the second data and the second derived CRC checksum.

In another feature, the computer program further comprises generating a first result by performing a modulo-2 summation of the first ECC value and the first derived ECC value, and a second result by performing a modulo-2 summation of the second ECC value and the second derived ECC value, and determining whether the third ECC value is valid based on the first and second results.

In still other features, a computer program executed by a processor comprises receiving a first block that includes a first data, a first cyclic redundancy check (CRC) checksum, and a first error-correcting code (ECC) value, wherein the first CRC checksum and the first ECC value include a logical block address (LBA). The computer program further comprises reading from a parity disk a second block that includes a second data, a second CRC checksum, and a second ECC value, wherein the second CRC checksum and the second ECC value include the LBA. The computer program further comprises generating a first derived CRC checksum based on the first data, wherein the first derived CRC checksum does not include the LBA, generating a modulo-2 sum of the first CRC checksum and the first derived CRC checksum, generating an encoded value of the modulo-2 sum using the same error-correcting code that is used to generate the first and second ECC values, and generating a third ECC value by performing a modulo-2 summation of the encoded value and the first and second ECC values, wherein the third ECC value includes the LBA.

In still other features, a computer program executed by a processor comprises receiving a first block that includes a first data, a first cyclic redundancy check (CRC) checksum, and a first error-correcting code (ECC) value, wherein the first CRC checksum and the first ECC value include a logical block address (LBA). The computer program further comprises reading from a parity disk a second block that includes a second data, a second CRC checksum, and a second ECC value, wherein the second CRC checksum and the second ECC value include the LBA. The computer program further comprises generating a first derived CRC checksum based on the first data, wherein the first derived CRC checksum does not include the LBA, generating a first derived ECC value based on the first data and the first derived CRC checksum, and generating a third ECC value by performing a modulo-2 summation of the first derived ECC value and the second ECC value, wherein the third ECC value includes the LBA.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2A:
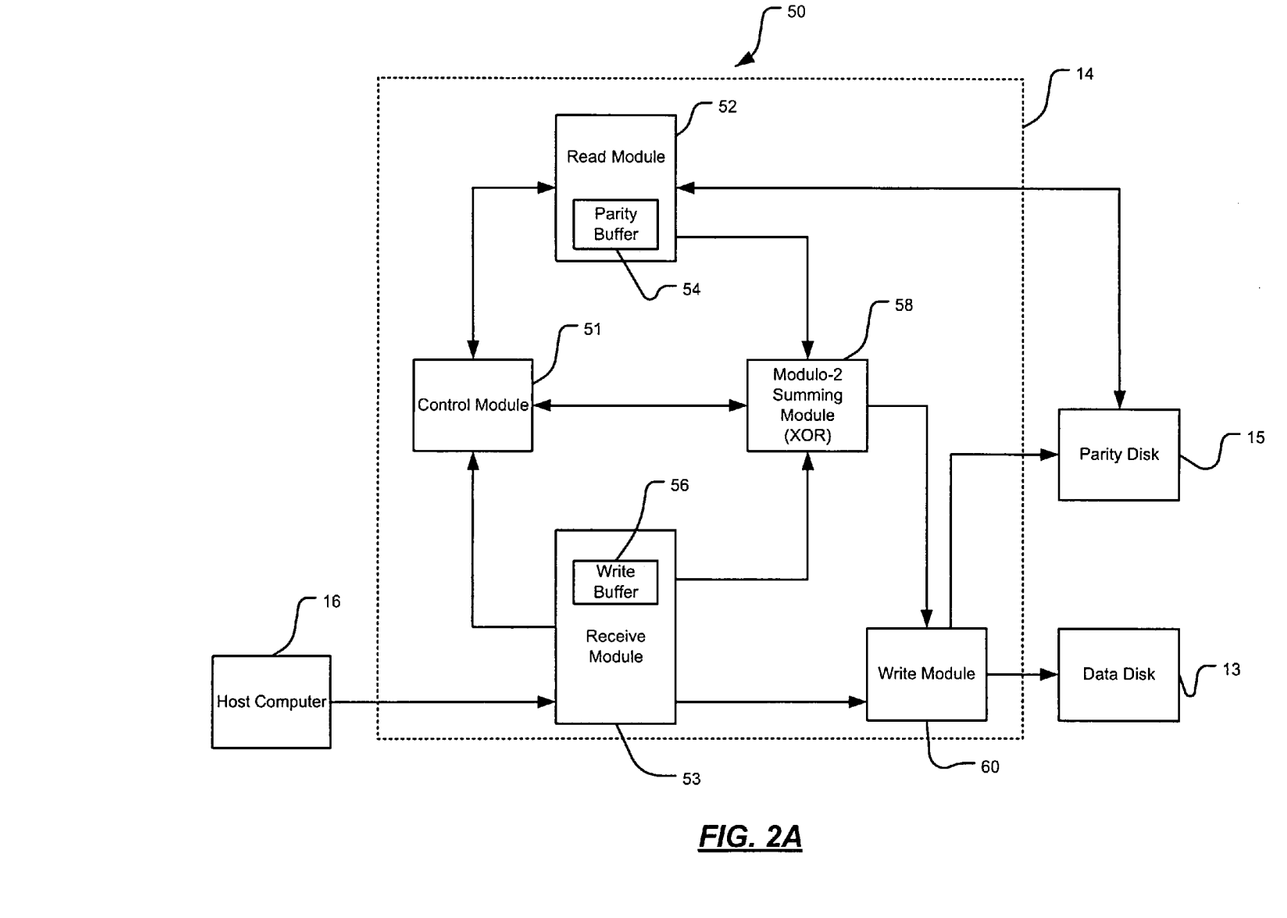
FIG. 2A is a functional block diagram of an exemplary system for computing an error-correcting code (ECC) of a data block obtained by exclusive OR (XOR) of two data blocks according to the present disclosure.
Figure 2B:
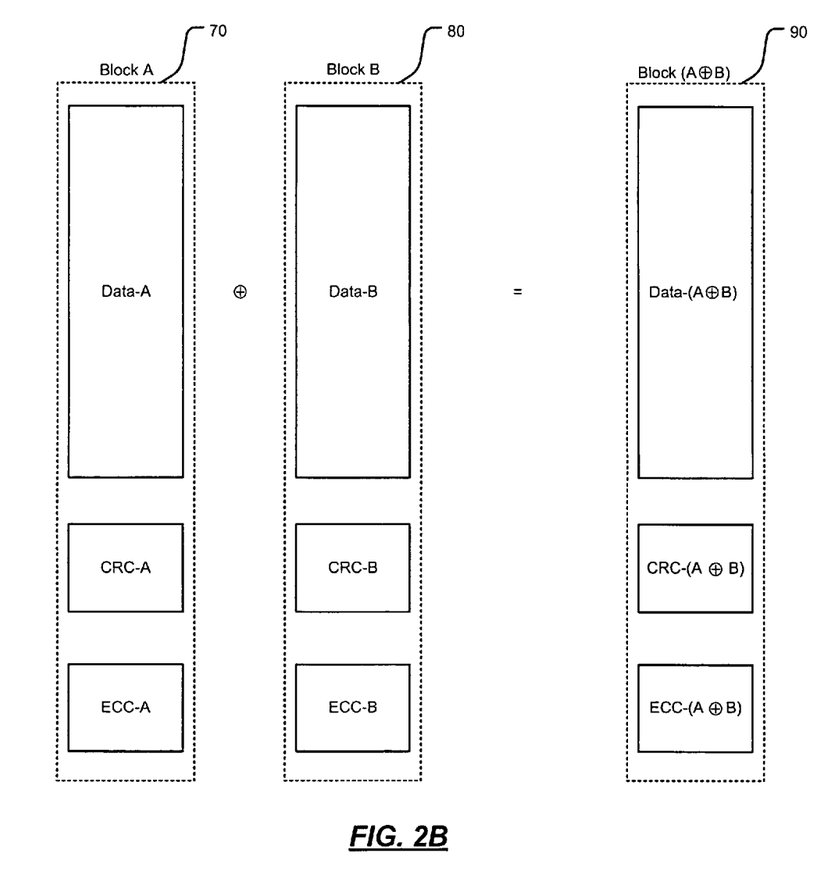
FIG. 2B is a schematic showing an exemplary composition of data blocks.
Figure 2C:
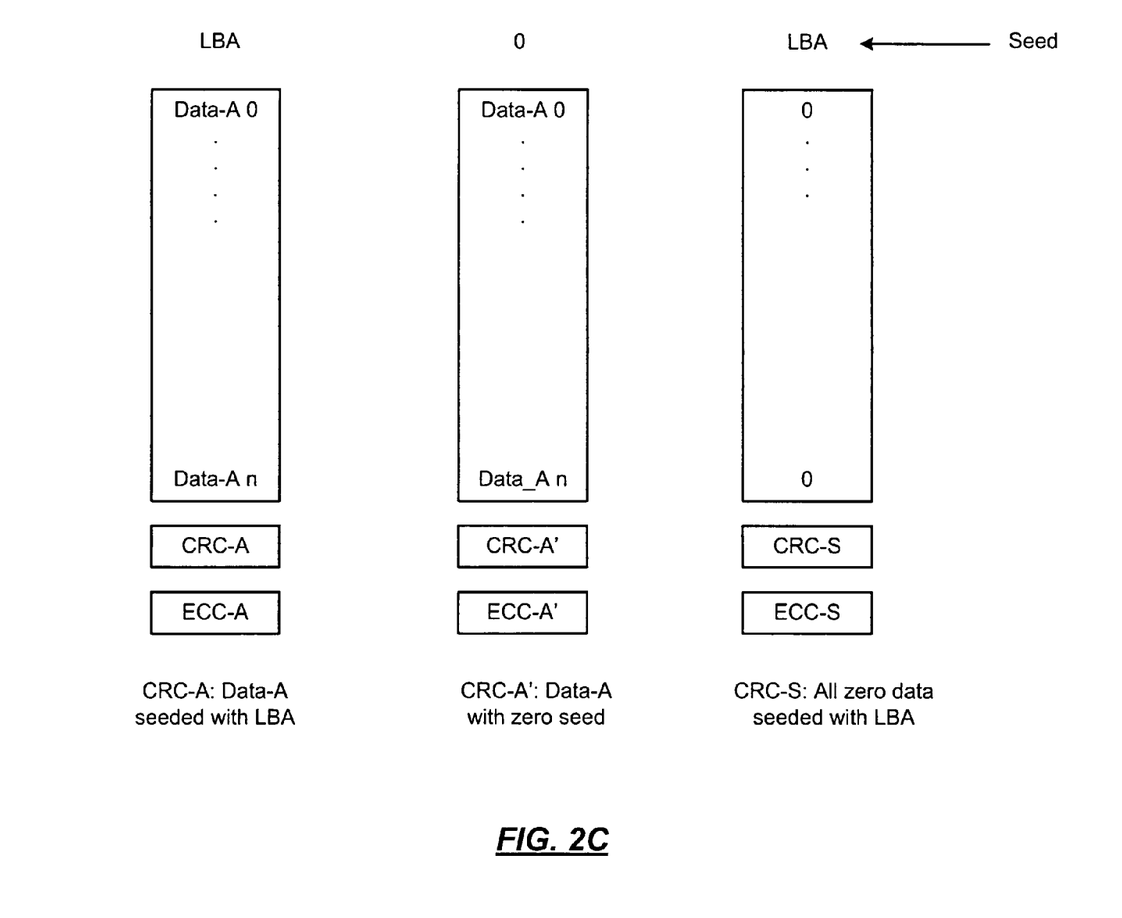
FIG. 2C is a schematic showing differences in cyclic redundancy checks (CRCs) computed using different data and different seed information.

The present disclosure discloses systems and methods for computing and validating error-correcting code (ECC) for a data block obtained by exclusive OR (XOR) of a data block to be written on a data disk and a data block read from a parity disk. Referring now to FIGS. 2A-2C, a system 50 for computing and validating ECC comprises a control module 51, a receive module 53, a write buffer 56, a read module 52, a parity buffer 54, a modulo-2 summing module (i.e., an XOR module) 58, and a write module 60.

A host computer 16 sends a data block A 70 to be written on a data disk 13 to a RAID controller 14. The receive module 53 receives the data block A 70 and stores the data block A 70 in the write buffer 56. The data block A 70 includes data-A, a cyclic redundancy check (CRC) checksum CRC-A, and an ECC value ECC-A. CRC-A is generated based on data-A seeded with a logical block address (LBA). ECC-A is generated based on data-A and CRC-A. The host computer 16 or the control module 51 in the RAID controller 14 may generate CRC-A and ECC-A for the data block A 70. ECC-A is generated using an error-correcting code such as a Reed-Solomon (RS) code. CRC-A and ECC-A are appended to the data block A 70 as shown in FIG. 2B.

The control module 51 activates the read module 52 when the receive module 53 receives the data block A 70. The read module 52 reads a data block B 80 from a parity disk 15 and stores the data block B 80 in the parity buffer 54. The data blocks A 70 and B 80 have the same logical block address (LBA). The data block B 80 includes data-B, CRC-B, and ECC-B as shown in FIG. 2B. CRC-B and ECC-B are generated in the same manner as CRC-A and ECC-A.

The modulo-2 summing module or the XOR module 58 generates modulo-2 sums by performing XOR operations on inputs received by the XOR module 58. The XOR module 58 performs an XOR operation on data blocks A 70 and B 80 to generate an XOR'ed data block (A⊕B) 90. The write module 60 writes the XOR'ed data block (A⊕B) 90 over data block B 80 in the parity disk 15. Additionally, the write module 60 writes the data block A 70 on the data disk 13.

Since data blocks A 70 and B 80 have the same LBA, CRC-A and CRC-B have identical seed information (i.e., LBA information). Mathematically, CRC-A and CRC-B may be expressed as follows.

CRC-A=CRC-A'⊕CRC-S (Equation 1)

CRC-B=CRC-B'⊕CRC-S (Equation 2)

where CRC-S denotes CRC of the data blocks having the same block-size and all-zero data seeded with the LBA. Additionally, CRC-A' denotes CRC of data-A in data block A 70 with zero seed, and CRC-B' denotes CRC of data-B in data block B 80 with zero seed. Differences among CRC-A, CRC-A', and CRC-S are shown in FIG. 2C.

When the XOR module 58 performs an XOR operation on data blocks A 70 and B 80, CRC-S cancels out because CRC-S for data block A 70 is identical to CRC-S for data block B 80. That is, CRC-S⊕CRC-S=0. Thus, adding equations 1 and 2, we get CRC-A⊕CRC-B=CRC-A'⊕CRC-B' (Equation 3)

Since CRC(A⊕B) calculated using equation 3 will not include the LBA seed information, equation 3 cannot be used to calculate CRC(A⊕B) for the XOR'ed data block (A⊕B) 90.

Instead, the XOR module 58 calculates CRC(A⊕B) for the XOR'ed data block (A⊕B) 90 as follows, where CRC(A⊕B) includes the LBA seed information.

CRC(A⊕B)=CRC-A'⊕CRC-B'⊕CRC-S (Equation 4)

Simplifying Equation 4 using equations 1, 2, and 3, we get

CRC(A⊕B)=CRC-A⊕CRC-B⊕CRC-A⊕CRC-A'.

Since CRC-A⊕CRC-A=0, we get

CRC(A⊕B)=CRC-A'⊕CRC-B.

The XOR module 58 generates CRC(A⊕B) by performing an XOR operation on CRC of data-A in data block A 70 with zero seed and CRC of data-B in data block B 80 seeded with the LBA.

Specifically, the control module 51 generates CRC-A' at the same time when the receive module 53 receives data block A 70 from the host computer 16 and stores the data block A 70 in the write buffer 56. The control module 51 provides CRC-A' to the XOR module 58. Additionally, the XOR module 58 reads CRC-B from data block B 80 stored in the parity buffer 54. The XOR module 58 performs an XOR operation on CRC-A' and CRC-B to generate CRC(A⊕B).

ECC of a data block is a linear combination of a RS codeword generated based on data in the data block and CRC of the data block with seed information. The system 50 generates ECC(A⊕B) of the XOR'ed data block (A⊕B) 90 that includes the LBA seed information in one of two ways.

In one way, the XOR module 58 generates ECC (A⊕B) using the following equation.

ECC(A⊕B)=ECC-A⊕ECC-B⊕RS(CRC-S)

where ECC-A is a RS computation of data-A in data block A 70 and CRC-A, and ECC-B is the RS computation of data-B in data block B 80 and CRC-B. Additionally, RS(CRC-S) is the RS computation of CRC-S without any data, where

CRC-S=CRC-A⊕CRC-A' or CRC-S=CRC-B⊕CRC-B'.

The control module 51 generates RS(CRC-S) as follows. The control module 51 generates CRC-A' when the receive module 53 receives the data block A 70. The control module 51 provides CRC-A' to the XOR module 58. The XOR module 58 reads CRC-A from the write buffer 56 and performs an XOR operation on CRC-A' and CRC-A to generate CRC-S. The control module 51 receives CRC-S from the XOR module 58 generates the RS computation of CRC-S without any data in one cycle. The control module 51 generates RS(CRC-S) using the same RS code with which ECC-A and ECC-B are generated.

The XOR module 58 receives RS(CRC-S) from the control module 51. Additionally, the XOR module 58 reads ECC-A from the write buffer 56 and ECC-B from the parity buffer 54. Subsequently, the XOR module 58 performs an XOR operation on ECC-A, ECC-B, and RS(CRC-S) to generate ECC (A⊕B).

The XOR module 58 does not generate ECC(A⊕B) directly from the data in the XOR'ed data block (A⊕B) 90. Instead, the XOR module 58 generates ECC(A⊕B) from ECC-A and ECC-B. Thus, if an error occurs in generating the XOR'ed data block (A⊕B) 90, that error does not propagate in ECC(A⊕B).

Alternatively, the XOR module 58 may generate ECC (A⊕B) using the following equation.

$$ECC(A⊕B)=ECC\text{-}A'⊕ECC\text{-}B$$

where ECC-A' is the RS computation of data-A in data block A 70 and CRC-A'. The control module 51 generates ECC-A' at the same time when the receive module 53 receives data block A 70 from the host computer 16. The control module 51 generates ECC-A' by performing RS computation of data-A in data block A 70 and CRC-A'. The control module 51 disregards the LBA or the LBA seed information of the data block A 70. The control module 51 provides ECC-A' to the XOR module 58.

Additionally, the XOR module 58 reads ECC-B from the parity buffer 54. ECC-B includes the LBA seed information. Thus, when the XOR module 58 generates ECC(A⊕B) by performing an XOR operation on ECC-A' and ECC-B, ECC (A⊕B) includes the LBA seed information. Additionally, since the XOR module 58 does not generate ECC(A⊕B) directly from the data in the XOR'ed data block (A⊕B) 90, if an error occurs in generating the XOR'ed data block (A⊕B) 90, that error does not propagate in ECC(A⊕B).

The system 50 validates ECC(A⊕B) as follows. ECC (A⊕B) is valid if the following equation is true.

$$ECC\text{-}A⊕ECC\text{-}A'=ECC\text{-}B⊕ECC\text{-}B'$$

Specifically, the XOR module 58 reads ECC-A from the write buffer 56. The XOR module 58 receives ECC-A' from the control module 51. The XOR module 58 performs an XOR operation on ECC-A and ECC-A' and stores the result in memory.

Additionally, the XOR module 58 reads ECC-B from the parity buffer 54. The control module 51 generates ECC-B' by computing the RS value of data-B in data block B 80 and CRC-B', where CRC-B' is the CRC of data-B in data block B 80 with zero seed. The control module 51 provides ECC-B' to the XOR module 58. The XOR module 58 performs an XOR operation on ECC-B and ECC-B' and stores the result in memory. The control module 51 compares the results of the two XOR operations. ECC(A⊕B) is valid if the results match. Otherwise, an error signal is generated.

Some disk drives use a skip-mask feature, which enables jumping over or skipping contiguous data blocks during read/write operations. In that case, data blocks being XOR'ed may not be sequential. Generally, additional supporting logic tracks the LBAs of data blocks to be skipped. However, since the system 50 calculates ECC(A⊕B) without regard to (i.e., without knowledge of) the LBA, the system 50 eliminates the need for additional supporting logic during skip-mask operations.

Figure 3A:
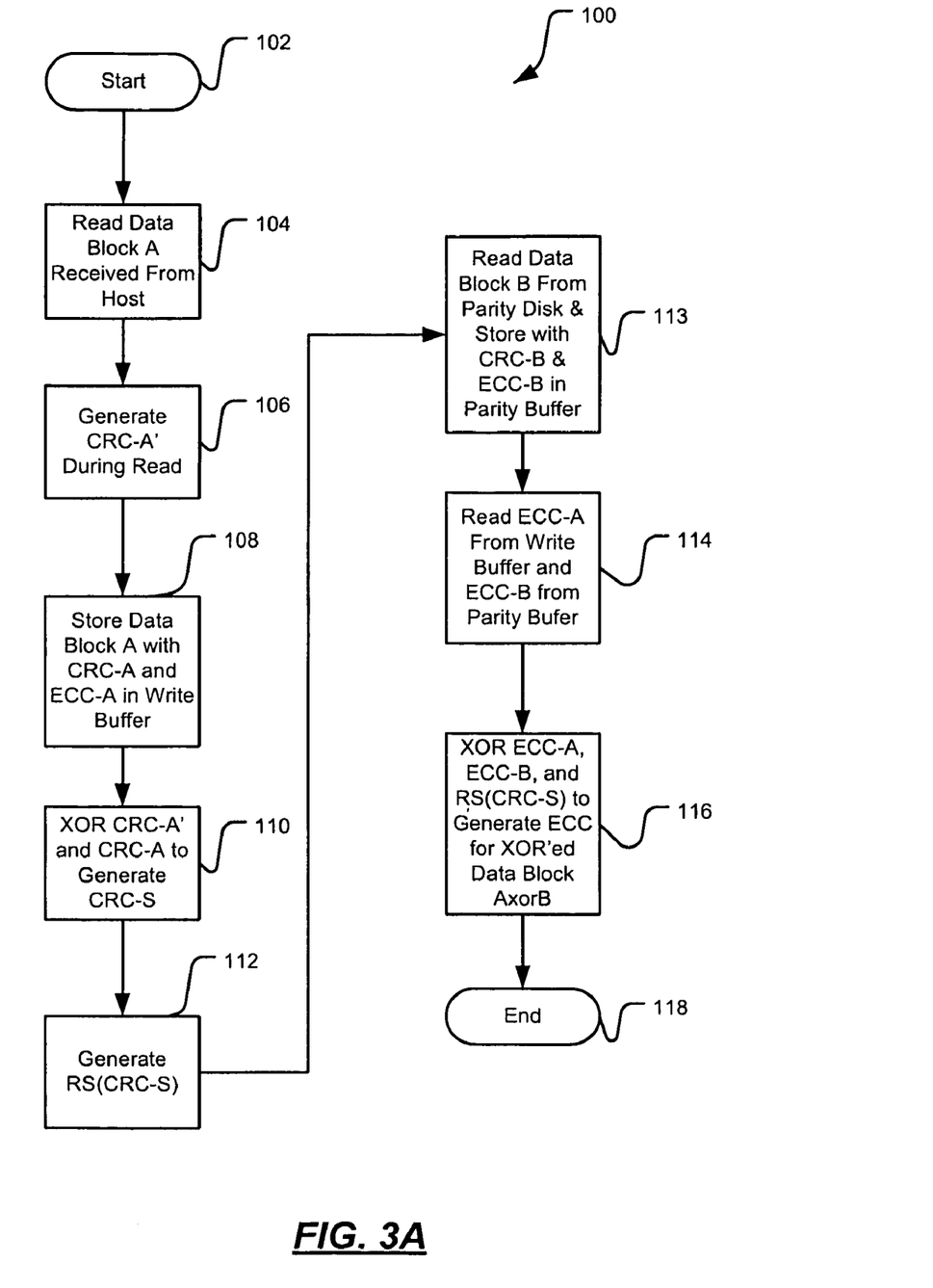
FIG. 3A is an exemplary method for generating an ECC of a data block obtained by exclusive OR (XOR) of two data blocks according to the present disclosure.
Figure 3B:
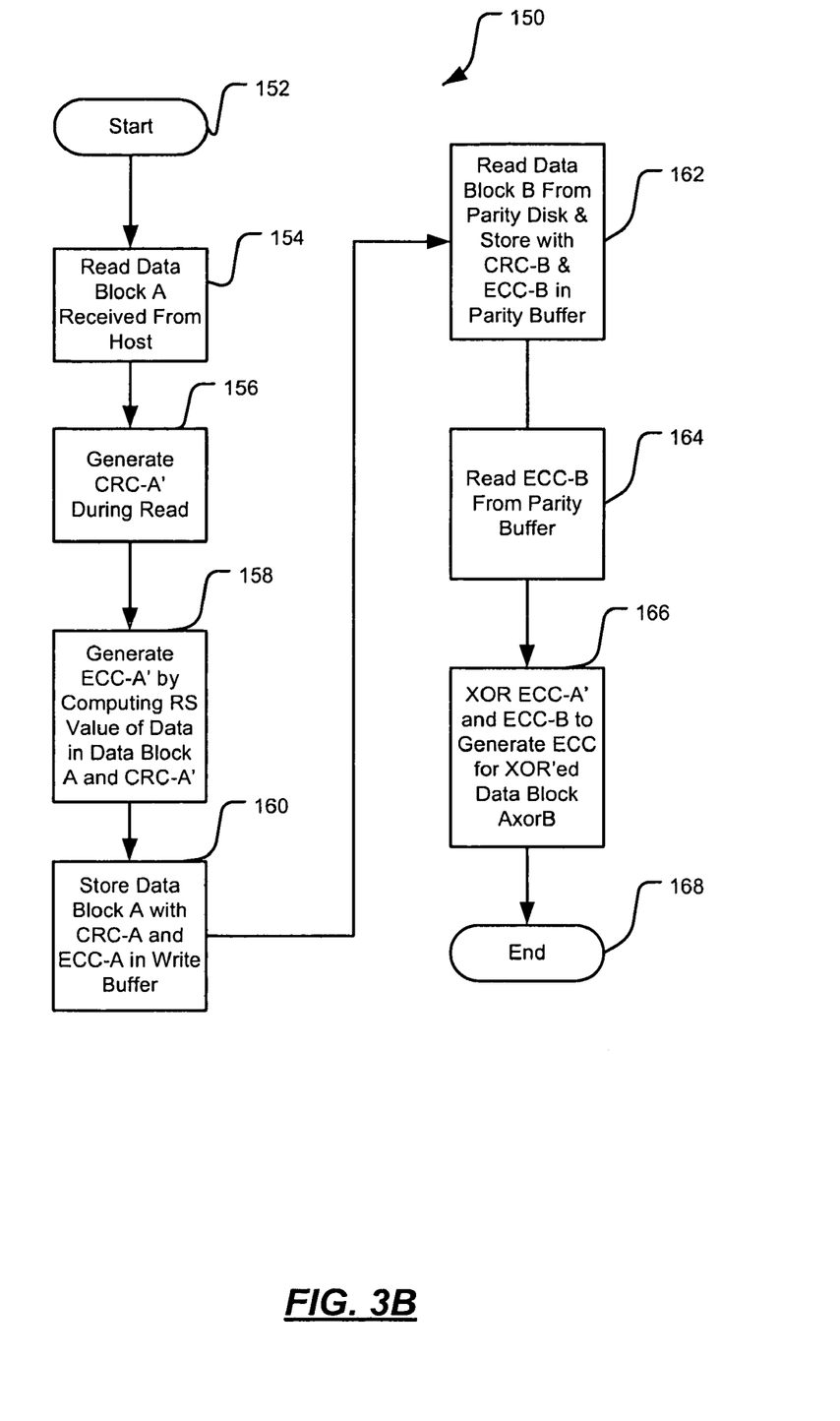
FIG. 3B is an exemplary method for generating an ECC of a data block obtained by exclusive OR (XOR) of two data blocks according to the present disclosure.
Figure 3C:
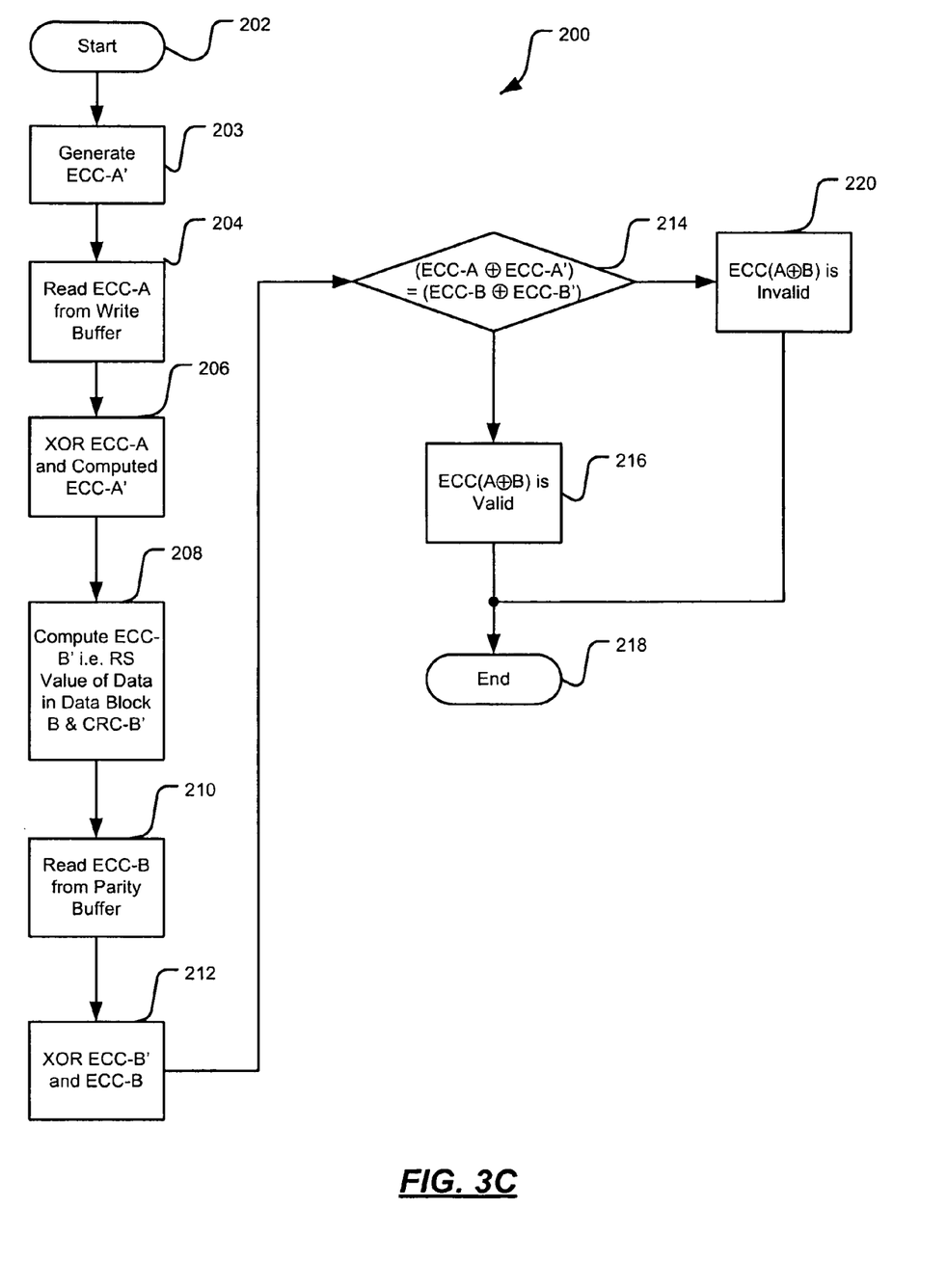
FIG. 3C is an exemplary method for validating an ECC of a data block obtained by exclusive OR (XOR) of two data blocks according to the present disclosure.

Referring now to FIGS. 3A-3C, various methods for generating and validating ECC(A⊕B) of an XOR'ed data block (A⊕B) 90 are shown. Referring now to FIG. 3A, a method 100 for generating ECC(A⊕B) begins at step 102. A receive module 53 receives a data block A 70 from a host computer 16 in step 104. While the receive module 53 receives the data block A 70, the control module 51 generates CRC-A' (i.e., CRC of data-A in data block A 70 with zero seed) in step 106 and stores CRC-A' in memory.

The receive module 53 stores data block A 70 with CRC-A (i.e., CRC of data-A in data block A 70 seeded with the LBA) and ECC-A (i.e., ECC or RS value of data-A in data block A 70 and CRC-A) in a write buffer 56 in step 108. The XOR module 58 reads CRC-A from the write buffer 56 and receives CRC-A' from the control module 51 and performs an XOR operation on CRC-A and CRC-A' to generate CRC-S in step 110. The control module 51 generates RS(CRC-S) by performing an RS encoding operation on CRC-S in step 112 and stores RS(CRC-S) in memory.

A read module 52 reads a data block B 80 from a parity disk 15 in step 113 and stores the data block B 80 with CRC-B and ECC-B in a parity buffer 54. The XOR module 58 reads ECC-A from the write buffer 56, ECC-B from the parity buffer 54, and RS(CRC-S) from the control module 51 in step 114. The XOR module 58 performs an XOR operation on ECC-A, ECC-B, and RS(CRC-S) to generate ECC(A⊕B) for an XOR'ed data block (A⊕B) 90 in step 116.

Referring now to FIG. 3B, a method 150 for generating ECC(A⊕B) begins at step 152. A receive module 53 receives a data block A 70 sent by a host computer 16 in step 154. While the receive module 53 receives the data block A 70, the control module 51 generates CRC-A' (i.e., CRC of data-A in data block A 70 with zero seed) in step 156 and stores CRC-A' in memory. The control module 51 generates ECC-A' in step 158 by computing a RS value of data-A in data block A 70 and CRC-A' and stores ECC-A' in memory.

The control module 51 stores the data block A 70 with CRC-A (i.e., CRC of data-A in data block A 70 seeded with the LBA) and ECC-A (i.e., ECC or RS value of data-A in data block A 70 and CRC-A) in a write buffer 56 in step 160. A read module 52 reads a data block B 80 from a parity disk 15 in step 162 and stores the data block B 80 with CRC-B and ECC-B in a parity buffer 54.

The XOR module 58 receives ECC-A' from the control module 51 and reads ECC-B from the parity buffer 54 in step 164. The XOR module 58 performs an XOR operation on ECC-A' and ECC-B in step 166 to generate ECC(A e B) for an XOR'ed data block (A⊕B) 90.

Referring now to FIG. 3C, a method 200 for validating ECC(A⊕B) that is generated by methods 100 and 150 begins at step 202. A control module 51 generates ECC-A' in step 203 as explained in method 150 and stores ECC-A' in memory. An XOR module 58 receives ECC-A' from the control module 51 and reads ECC-A of data block A 70 from a write buffer 56 in step 204. The XOR module 58 performs an XOR operation on ECC-A' and ECC-A in step 206 and stores the result in memory.

The control module 51 generates ECC-B' (i.e., RS value of data-B in data block B 80 and CRC-B') in step 208 and stores ECC-B' in memory. The XOR module 58 receives ECC-B' from the control module 51 and reads ECC-B from a parity buffer 54 in step 210. The XOR module 58 performs an XOR operation on ECC-B' and ECC-B in step 212 and stores the result in memory.

The control module 51 determines in step 214 if results of step 206 and 212 match. If true, the control module 51 determines in step 216 that the ECC(A⊕B) generated by methods 100 and/or 150 is valid, and the method 200 ends in step 218. Otherwise, the control module 51 determines in step 220 that the ECC(A⊕B) generated by methods 100 and/or 150 is invalid, and the method 200 ends in step 218.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
a receive module that receives a first block, wherein the first block includes first data, a first cyclic redundancy check (CRC) checksum, and a first error-correcting code (ECC) value, and wherein the first CRC checksum and the first ECC value include a logical block address (LBA);
a control module that generates a first derived CRC checksum based on the first data, wherein the first derived CRC checksum does not include the LBA; and
a read module in communication with the control module, wherein the read module reads a second block from a parity disk, wherein the second block includes parity data, a second CRC checksum, and a second ECC value, and wherein the second CRC checksum and the second ECC value include the LBA.

2. The system of claim 1, further comprising a write module in communication with the receive module, wherein the write module writes the first block on a data disk.

3. The system of claim 1, wherein the first ECC value and the second ECC value are generated using an error-correcting code.

4. The system of claim 1, wherein the first ECC value and the second ECC value are generated using a Reed-Solomon code.

5. The system of claim 1, further comprising a summing module that
communicates with the control module, the receive module, and the read module, and
generates a first sum by performing a modulo-2 summation of (i) the first CRC checksum and (ii) the first derived CRC checksum.

6. The system of claim 5, wherein the control module generates a first encoded value of the first sum using the same error-correcting code that is used to generate the first and second ECC values.

7. The system of claim 6, wherein the summing module generates a third ECC value by performing a modulo-2 summation of the first encoded value, the first ECC value, and the second ECC value, wherein the third ECC value includes the LBA.

8. The system of claim 7, wherein the summing module generates
a third data by performing a modulo-2 summation of the first data and the parity data, and
a third CRC checksum by performing a module-2 summation of the first derived CRC checksum and the second CRC checksum.

9. The system of claim 8, further comprising a write module in communication with the summing module, wherein the write module writes the third data, the third CRC checksum, and the third ECC value on the parity disk.

10. The system of claim 8, wherein the control module generates
a first derived ECC value based on the first data and the first derived CRC checksum,
a second derived CRC checksum based on the parity data, wherein the second derived CRC checksum does not include the LBA, and
a second derived ECC value based on the parity data and the second derived CRC checksum.

11. The system of claim 10, wherein the summing module generates
a first result by performing a modulo-2 summation of the first ECC value and the first derived ECC value, and
a second result by performing a modulo-2 summation of the second ECC value and the second derived ECC value,
wherein the control module determines whether the third ECC value is valid based on the first result and the second result.

12. The system of claim 1, wherein the control module generates a first derived ECC value based on the first data and the first derived CRC checksum using the same error-correcting code that is used to generate the first and second ECC values.

13. The system of claim 12, further comprising a summing module that generates a third ECC value by performing a modulo-2 summation of the first derived ECC value and the second ECC value, wherein the third ECC value includes the LBA.

14. The system of claim 13, wherein the summing module generates
a third data by performing a modulo-2 summation of the first data and the parity data, and
a third CRC checksum by performing a module-2 summation of the first derived CRC checksum and the second CRC checksum.

15. The system of claim 14, further comprising a write module in communication with the summing module, wherein the write module writes the third data, the third CRC checksum, and the third ECC value on the parity disk.

16. The system of claim 13, wherein the control module generates
a second derived CRC checksum based on the parity data, wherein the second derived CRC checksum does not include the LBA, and
a second derived ECC value based on the parity data and the second derived CRC checksum.

17. The system of claim 16, wherein the summing module generates
a first result by performing a modulo-2 summation of the first ECC value and the first derived ECC value, and
a second result by performing a modulo-2 summation of the second ECC value and the second derived ECC value,
wherein the control module determines whether the third ECC value is valid based on (i) the first result and (ii) the second result.

18. A disk controller comprising the system of claim 1.

19. A system, comprising:
a receive module that receives a first block, wherein the first block includes first data, a first cyclic redundancy check (CRC) checksum, and a first error-correcting code (ECC) value, and wherein the first CRC checksum and the first ECC value include a logical block address (LBA);
a read module that reads a second block from a parity disk, wherein the second block includes parity data, a second CRC checksum, and a second ECC value, and wherein the second CRC checksum and the second ECC value include the LBA; and
a control module that generates
a first derived CRC checksum based on the first data, wherein the first derived CRC checksum does not include the LBA,
a modulo-2 sum of (i) the first CRC checksum and (ii) the first derived CRC checksum,
an encoded value of the modulo-2 sum using the same error-correcting code that is used to generate the first and second ECC values, and a third ECC value by performing a modulo-2 summation of the encoded value and the first and second ECC values, wherein the third ECC value includes the LBA.

20. A system, comprising:
a receive module that receives a first block, wherein the first block includes first data, a first cyclic redundancy check (CRC) checksum, and a first error-correcting code (ECC) value, and wherein the first CRC checksum and the first ECC value include a logical block address (LBA);
a read module that reads a second block from a parity disk, wherein the second block that includes parity data, a second CRC checksum, and a second ECC value, and wherein the second CRC checksum and the second ECC value include the LBA; and
a control module that generates
a first derived CRC checksum based on the first data, wherein the first derived CRC checksum does not include the LBA,
a first derived ECC value based on (i) the first data and (ii) the first derived CRC checksum, and
a third ECC value by performing a modulo-2 summation of the first derived ECC value and the second ECC value, wherein the third ECC value includes the LBA.

21. A method, comprising:
receiving a first block that includes first data, a first cyclic redundancy check (CRC) checksum, and a first error-correcting code (ECC) value, wherein the first CRC checksum and the first ECC value include a logical block address (LBA);
generating a first derived CRC checksum based on the first data, wherein the first derived CRC checksum does not include the LBA; and
reading a second block from a parity disk, wherein the second block includes parity data, a second CRC checksum, and a second ECC value, and wherein the second CRC checksum and the second ECC value include the LBA.

22. The method of claim 21, further comprising writing the first block on a data disk.

23. The method of claim 21, further comprising generating the first ECC value and the second ECC value using an error-correcting code.

24. The method of claim 21, further comprising generating the first ECC value and the second ECC value using a Reed-Solomon code.

25. The method of claim 21, further comprising generating a first sum by performing a modulo-2 summation of (i) the first CRC checksum and (ii) the first derived CRC checksum.

26. The method of claim 25, further comprising generating a first encoded value of the first sum using the same error-correcting code that is used to generate the first and second ECC values.

27. The method of claim 26, further comprising generating a third ECC value by performing a modulo-2 summation of (i) the first encoded value and (ii) the first and second ECC values, wherein the third ECC value includes the LBA.

28. The method of claim 27, further comprising:
generating a third data by performing a modulo-2 summation of (i) the first data and (ii) the parity data, and
generating a third CRC checksum by performing a module-2 summation of (i) the first derived CRC checksum and (ii) the second CRC checksum.

29. The method of claim 28, further comprising writing the third data, the third CRC checksum, and the third ECC value on the parity disk.

30. The method of claim 28, further comprising:
generating a first derived ECC value based on (i) the first data and (ii) the first derived CRC checksum,
generating a second derived CRC checksum based on the parity data, wherein the second derived CRC checksum does not include the LBA, and
generating a second derived ECC value based on the (i) parity data and (ii) the second derived CRC checksum.

31. The method of claim 30, further comprising:
generating a first result by performing a modulo-2 summation of (i) the first ECC value and (ii) the first derived ECC value, and
generating a second result by performing a modulo-2 summation of (i) the second ECC value and (ii) the second derived ECC value, and
determining whether the third ECC value is valid based on (i) the first result and (ii) the second result.

32. The method of claim 21, further comprising generating a first derived ECC value based on the first data and the first derived CRC checksum using the same error-correcting code that is used to generate the first and second ECC values.

33. The method of claim 32, further comprising further comprising generating a third ECC value by performing a modulo-2 summation of (i) the first derived ECC value and (ii) the second ECC value, wherein the third ECC value includes the LBA.

34. The method of claim 33, further comprising:
generating a third data by performing a modulo-2 summation of (i) the first data and (ii) the parity data, and
generating a third CRC checksum by performing a module-2 summation of (i) the first derived CRC checksum and (ii) the second CRC checksum.

35. The method of claim 34, further comprising writing the third data, the third CRC checksum, and the third ECC value on the parity disk.

36. The method of claim 33, further comprising:
generating a second derived CRC checksum based on the parity data, where the second derived CRC checksum does not include the LBA, and
generating a second derived ECC value based on (i) the parity data and (ii) the second derived CRC checksum.

37. The method of claim 36, further comprising:
generating a first result by performing a modulo-2 summation of (i) the first ECC value and (ii) the first derived ECC value,
generating a second result by performing a modulo-2 summation of (i) the second ECC value and (ii) the second derived ECC value, and
determining whether the third ECC value is valid based on (i) the first result and (ii) the second result.

38. A method, comprising:
receiving a first block that includes first data, a first cyclic redundancy check (CRC) checksum, and a first error-correcting code (ECC) value, wherein the first CRC checksum and the first ECC value include a logical block address (LBA);
reading a second block from a parity disk, wherein the second block includes parity data, a second CRC checksum, and a second ECC value, and wherein the second CRC checksum and the second ECC value include the LBA;
generating a first derived CRC checksum based on the first data, wherein the first derived CRC checksum does not include the LBA;
generating a modulo-2 sum of (i) the first CRC checksum and (ii) the first derived CRC checksum;

generating an encoded value of the modulo-2 sum using the same error-correcting code that is used to generate the first and second ECC values; and generating a third ECC value by performing a modulo-2 summation of (i) the encoded value and (ii) the first and second ECC values, wherein the third ECC value includes the LBA.

39. A method, comprising:

receiving a first block that includes first data, a first cyclic redundancy check (CRC) checksum, and a first error-correcting code (ECC) value, wherein the first CRC checksum and the first ECC value include a logical block address (LBA);

reading a second block from a parity disk, wherein the second block that includes parity data, a second CRC checksum, and a second ECC value, wherein the second CRC checksum and the second ECC value include the LBA;

generating a first derived CRC checksum based on the first data, wherein the first derived CRC checksum does not include the LBA;

generating a first derived ECC value based on (i) the first data and (ii) the first derived CRC checksum; and generating a third ECC value by performing a modulo-2 summation of (i) the first derived ECC value and (ii) the second ECC value, wherein the third ECC value includes the LBA.

* * * * *